(12) United States Patent
Garver et al.

(10) Patent No.: US 9,982,812 B2
(45) Date of Patent: May 29, 2018

(54) MULTILAYER FLEXIBLE TUBE AND METHODS FOR MAKING SAME

(71) Applicant: SAINT-GOBAIN PERFORMANCE PLASTICS CORPORATION, Solon, OH (US)

(72) Inventors: Wayne Edward Garver, Hudson, OH (US); Gerald H. Ling, Wayland, MA (US); Charles S. Golub, Westford, MA (US); Kathryn J. Morris, Tallmadge, OH (US); Mark F. Colton, Rootstown, OH (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 412 days.

(21) Appl. No.: 14/643,456

(22) Filed: Mar. 10, 2015

(65) Prior Publication Data
US 2015/0252918 A1    Sep. 10, 2015

Related U.S. Application Data

(60) Provisional application No. 61/950,602, filed on Mar. 10, 2014.

(51) Int. Cl.
*F16L 11/12*    (2006.01)
*F16L 11/04*    (2006.01)
(Continued)

(52) U.S. Cl.
CPC .......... *F16L 11/12* (2013.01); *B29C 47/0004* (2013.01); *B29C 47/0023* (2013.01);
(Continued)

(58) Field of Classification Search
CPC .......... F16L 11/04; F16L 11/045; F16L 11/12; B32B 1/08; B29C 47/0004;
(Continued)

(56) References Cited

U.S. PATENT DOCUMENTS 4,028,431 A * 6/1977 Futami .................... C08L 27/12
525/104
5,919,434 A * 7/1999 Dugstad et al. ....... A61K 49/04
(Continued)

FOREIGN PATENT DOCUMENTS

CA    2147045 A1    10/1995
CN    101484316 A    7/2009
(Continued)

OTHER PUBLICATIONS

International Search Report from PCT/US2015/019682 dated Jun. 29, 2015, 1 pg.
(Continued)

*Primary Examiner* — Walter B Aughenbaugh
(74) *Attorney, Agent, or Firm* — Abel Law Group, LLP; Chi Suk Kim (57) ABSTRACT

A multilayer flexible tube includes an inner layer including a melt processable fluoropolymer, wherein the fluoropolymer includes a copolymer of a poly vinylidene fluoride (PVDF) and a hexafluoropropylene (HFP); and an outer layer including a melt processable polymer having a shore hardness less than a shore hardness of the inner layer. Further provided is a method of making the multilayer flexible tube.

18 Claims, 1 Drawing Sheet

(51) Int. Cl.
  *B29C 47/00* (2006.01)
  *B32B 7/12* (2006.01)
  *B32B 27/08* (2006.01)
  *B32B 27/18* (2006.01)
  *B32B 27/30* (2006.01)
  *B32B 27/32* (2006.01)
  *B32B 27/34* (2006.01)
  *B32B 27/36* (2006.01)
  *B32B 27/40* (2006.01)
  *B32B 1/08* (2006.01)
  *B29C 47/06* (2006.01)
  *B29K 27/00* (2006.01)
  *B29L 23/00* (2006.01)

(52) U.S. Cl.
  CPC .......... *B29C 47/065* (2013.01); *B29C 47/067* (2013.01); *B32B 1/08* (2013.01); *B32B 7/12* (2013.01); *B32B 27/08* (2013.01); *B32B 27/18* (2013.01); *B32B 27/302* (2013.01); *B32B 27/304* (2013.01); *B32B 27/322* (2013.01); *B32B 27/34* (2013.01); *B32B 27/36* (2013.01); *B32B 27/40* (2013.01); *F16L 11/04* (2013.01); *F16L 11/045* (2013.01); *B29K 2027/16* (2013.01); *B29L 2023/006* (2013.01); *B32B 2250/24* (2013.01); *B32B 2307/536* (2013.01); *B32B 2307/54* (2013.01); *Y10T 428/1393* (2015.01)

(58) Field of Classification Search
  CPC . B29C 47/0023; B29C 47/065; B29C 47/067; Y10T 428/1393
  See application file for complete search history.

(56) References Cited

U.S. PATENT DOCUMENTS

| | | | |
|---|---|---|---|
| 6,807,988 B2 * | 10/2004 | Powell | F16L 11/082 138/125 |
| 7,342,072 B2 | 3/2008 | Park et al. | |
| RE40,516 E | 9/2008 | Parsonage et al. | |
| 8,137,812 B2 | 3/2012 | Kitahara et al. | |
| 8,202,617 B2 | 6/2012 | Kitahara et al. | |
| 9,403,960 B2 | 8/2016 | Kithara et al. | |
| 2003/0198769 A1 | 10/2003 | Jing et al. | |
| 2004/0145098 A1 * | 7/2004 | Thaler | A62B 35/04 267/33 |
| 2005/0124976 A1 * | 6/2005 | Devens, Jr. | A61M 25/0045 604/523 |
| 2005/0217746 A1 * | 10/2005 | Hayashi et al. | F16L 9/14 |
| 2007/0044906 A1 * | 3/2007 | Park | B29C 47/0023 156/272.2 |
| 2007/0190284 A1 | 8/2007 | Park | |
| 2008/0230136 A1 * | 9/2008 | Sakazaki | B32B 1/08 138/137 |
| 2008/0248226 A1 | 10/2008 | Simon et al. | |
| 2009/0169790 A1 | 7/2009 | Nadeau et al. | |
| 2009/0202759 A1 | 8/2009 | O'Brien et al. | |
| 2009/0274857 A1 | 11/2009 | Garver et al. | |
| 2009/0274912 A1 | 11/2009 | Bonnet | |
| 2010/0034504 A1 | 2/2010 | Aten et al. | |
| 2010/0034919 A1 | 2/2010 | Brothers et al. | |
| 2010/0170632 A1 | 7/2010 | Gautriaud et al. | |
| 2010/0260991 A1 | 10/2010 | Subramanian et al. | |
| 2012/0045603 A1 | 2/2012 | Zerafati et al. | |
| 2012/0289641 A1 * | 11/2012 | Hirano | C08K 3/14 524/443 |
| 2013/0059101 A1 | 3/2013 | Aten et al. | |
| 2013/0108816 A1 | 5/2013 | Zerafati | |

FOREIGN PATENT DOCUMENTS

| | | |
|---|---|---|
| CN | 100587304 C | 2/2010 |
| CN | 102015278 A | 4/2011 |
| CN | 103597021 A | 2/2014 |
| EP | 1299435 A1 | 4/2003 |
| EP | 1432572 A1 | 6/2004 |
| JP | H0839105 A | 2/1996 |
| JP | H10286897 A | 10/1998 |
| JP | 2001122996 A | 5/2001 |
| JP | 2011518300 A | 6/2011 |
| WO | 02/00741 A1 | 1/2002 |
| WO | 03/028995 A1 | 4/2003 |
| WO | 2009135112 A2 | 11/2009 |
| WO | 2012162341 A1 | 11/2012 |
| WO | 2015138433 A1 | 9/2015 |

OTHER PUBLICATIONS

"PEBAX 2533 SA 01," Jan. 31, 2013, 2 pages, Arkema Specialty Polyamides, Colombes, France, https://www.palmerholland.com/Assets/User/Documents/Product/41071/4695/MITM01775.pdf.

"PEBAX 3533 SA 01 Med," Jan. 31, 2013, 2 pages, Arkema Specialty Polyamides, Colombes, France, http://www.foster-polymers.com/downloads/docs/pebax/tds/tds_pebax_3533_sa01_med.pdf.

"PEBAX 4033 SA 01 Med," Jan. 31, 2013, 2 pages, Arkema Specialty Polyamides, Colombes, France, http://www.foster-polymers.com/downloads/docs/pebax/tds/tds_pebax_4033_sa01_med.pdf.

"Kynar Flex & Kynar PVDF—resins PVDF / HFP copolymers," Aug. 31, 2006, 12 pages, Arkema Inc., http://asia.kynar.com/export/sites/kynar-asia/.content/medias/downloads/literature/kynar-kynar-flex-pvdf-wire-and-cable-brochure.pdf.

* cited by examiner

MULTILAYER FLEXIBLE TUBE AND METHODS FOR MAKING SAME

CROSS-REFERENCE TO RELATED APPLICATION

The present application claims priority from U.S. Provisional Patent Application No. 61/950,602, filed Mar. 10, 2014, entitled "MULTILAYER FLEXIBLE TUBE AND METHODS FOR MAKING SAME," naming inventors Wayne Garver et al., which application is incorporated by reference herein in its entirety.

FIELD OF THE DISCLOSURE

This application in general, relates to multilayer flexible tube and methods for making same, and in particular, relates to multilayer fluid conduits.

BACKGROUND

Hoses and tubing are used in a variety of industries including food processing, chemical industries, pharmaceutical industries, and fuel industries. In such industries, fluid conduits that have a low surface energy inner surface are used because they are easy to clean and resistant to contaminants. In particular, such industries are turning to low surface energy polymers such as fluoropolymers. However, such fluoropolymers are expensive and often have undesirable properties for certain applications.

Industry uses such fluoropolymers as liners for fluid conduit. However, many fluoropolymers desirable as an inner surface are difficult to adhere to other surfaces. For instance, when exposed to certain solvents, such as fuel, delamination between a fluoropolymer and a substrate typically occurs. Further, many fluoropolymers also are inflexible, making the material undesirable for applications that require stress, such as bend radius, pressures, and the like.

As such, an improved multilayer polymer article would be desirable.

SUMMARY

In an embodiment, a multilayer flexible tube includes an inner layer including a melt processable fluoropolymer, wherein the fluoropolymer includes a copolymer of a poly vinylidene fluoride (PVDF) and a hexafluoropropylene (HFP); and an outer layer including a melt processable polymer having a shore hardness less than a shore hardness of the inner layer.

In another embodiment, a method of making a multilayer flexible tube includes providing an inner layer including a melt processable fluoropolymer, wherein the fluoropolymer includes a copolymer of a poly vinylidene fluoride (PVDF) and a hexafluoropropylene (HFP); and providing an outer layer including a melt processable polymer having a shore hardness less than a shore hardness of the inner layer.

In a particular embodiment, a multilayer flexible tube includes an inner layer including a melt processable fluoropolymer, wherein the fluoropolymer includes a copolymer of a poly vinylidene fluoride (PVDF) and a hexafluoropropylene (HFP); an outer layer including a melt processable polymer having a shore hardness less than a shore hardness of the inner layer; and a tie layer disposed between the inner layer and the outer layer, wherein the tie layer includes a blend of a thermoplastic urethane with a fluoropolymer copolymer of hexafluoropropylene and poly vinylidene fluoride.

In a further embodiment, a multilayer flexible tube includes an inner layer including a melt processable fluoropolymer, wherein the fluoropolymer includes a copolymer of a poly vinylidene fluoride (PVDF) and a hexafluoropropylene (HFP); an outer layer including a melt processable polymer having a shore hardness less than a shore hardness of the inner layer; wherein the inner layer, the outer layer, or combination thereof includes a co-agent including bis-phenol AF, triaryl isocyanurate (TAIC), Triaryl cyanurate (TAC), an organic peroxide, or combination thereof.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having" or any other variation thereof, are open-ended terms and should be interpreted to mean "including, but not limited to . . . ." These terms encompass the more restrictive terms "consisting essentially of" and "consisting of." In an embodiment, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts. Unless indicated otherwise, all measurements are at about 23° C.+/−5° C. per ASTM, unless indicated otherwise.

In a particular embodiment, a multilayer flexible tube is provided. The multilayer flexible tube includes at least an inner layer and an outer layer. In an embodiment, the inner layer includes a fluoropolymer. Further, the outer layer includes a polymer having a shore hardness less than a shore hardness of the inner layer. Advantageously, the multilayer flexible tube has properties for applications that include exposure to fuel, dynamic stress, or combination thereof. A method of making a multilayer flexible tube is further provided.

The fluoropolymer of the inner layer typically is a melt processable fluoropolymer. "Melt processable fluoropolymer" as used herein refers to a fluoropolymer that can melt and flow to extrude in any reasonable form such as films, tubes, fibers, molded articles, or sheets. For instance, the melt processable fluoropolymer is a flexible material. For instance, the melt processable fluoropolymer has a flexural modulus of greater than about 50 MPa, such as a flex modulus of about 50 MPa to about 850 MPa, such as about 50 MPa to about 300 MPa. In an embodiment, the melt processable fluoropolymer has an elongation at yield of greater than about 5%, such as greater than about 7%, such as greater than about 8%, or even greater than about 10%.

An exemplary melt processable fluoropolymer of the inner layer may be formed of a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. An exemplary melt processable fluoropolymer includes a copolymer of a poly vinylidene fluoride (PVDF) and a hexafluoropropylene (HFP), a polytetrafluoroethylene (PTFE), a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), a polychlorotrifluoroethylene (PCTFE), a poly vinylidene fluoride (PVDF), a terpolymer including tetrafluoroethylene, hexafluoropropylene, and a vinylidenefluoride (THV), a polyvinyl fluoride (PVF, e.g., Tedlar™), a terpolymer of tetrafluoroethylene, hexafluoroproplyene, and ethylene, or any blend, any alloy, or combination thereof.

In an example, the melt processable fluoropolymer includes a copolymer of a poly vinylidene fluoride (PVDF) and a hexafluoropropylene (HFP). In an embodiment, the copolymer of the poly vinylidene fluoride (PVDF) and the hexafluoropropylene (HFP) includes an advantageous molar concentration of about 1:99 to about 99:1, such as about 20:80 to about 80:20, or about 40:60 to about 60:40. In a particular embodiment, the copolymer includes a portion of hexafluoropropylene, such as a molar concentration of greater than about 10%, such as greater than about 15%, such as greater than about 20%, or even greater than about 25%, based on a 100% total molar concentration of the copolymer.

In a further embodiment, the inner layer may include any additive envisioned. The additive may include, for example, a co-agent, an antioxidant, a filler, an ultraviolet (UV) agent, a dye, a pigment, an anti-aging agent, a plasticizer, the like, or combination thereof. In an embodiment, the co-agent is a cross-linking agent provided to increase and/or enhance crosslinking of the fluoropolymer composition of the inner layer. In a further embodiment, the use of a co-agent may provide desirable properties such as decreased permeation of small molecules and improved elastic recovery of the inner layer compared to an inner layer that does not include a co-agent. Any co-agent is envisioned such as, for example, bis-phenol AF, triaryl isocyanurate (TAIC), Triaryl cyanurate (TAC), an organic peroxide, or combination thereof. Any amount of co-agent is envisioned. Alternatively, the inner layer may be substantially free of crosslinking agents, co-agents, photoinitiators, fillers, plasticizers, or a combination thereof. "Substantially free" as used herein refers to less than about 1.0% by weight, or even less than about 0.1% by weight of the total weight of the fluoropolymer of the inner layer.

In a particular embodiment, the inner layer includes at least 70% by weight of the fluoropolymer. For example, the inner layer may include at least 85% by weight fluoropolymer, such as at least 90% by weight, at least 95% by weight, or even 100% by weight of the fluoropolymer. In an example, the inner layer may consist essentially of the fluoropolymer. In a particular example, the inner layer may consist essentially of the copolymer of poly vinylidene fluoride (PVDF) and hexafluoropropylene (HFP). As used herein, the phrase "consists essentially of" used in connection with the fluoropolymer of the inner layer precludes the presence of non-fluorinated polymers that affect the basic and novel characteristics of the fluoropolymer, although, commonly used processing agents and additives such as antioxidants, fillers, UV agents, dyes, pigments, anti-aging agents, and any combination thereof may be used in the fluoropolymer.

In a particular embodiment, the melt processable fluoropolymer has a desirable hardness. For instance, the shore hardness of the fluoropolymer of the inner layer is greater than the shore hardness of the polymer of the outer layer. For instance, the hardness of the inner layer is shore D of less than about 95, such as a shore A of about 80 to shore D of about 95, such as shore A of about 80 to shore D of about 65, such as shore A of about 85 to about 90. For instance, the copolymer of poly vinylidene fluoride (PVDF) and hexafluoropropylene (HFP) for the inner layer has a hardness of shore D of less than about 95, such as a shore A of about 80 to shore D of about 95, such as shore A of about 80 to shore D of about 65, such as shore A of about 85 to about 90.

In an example, the melt processable fluoropolymer of the inner layer has desirable mechanical properties, such as a desirable flexural modulus. The flexural modulus of the inner layer may be less than about 20,000 psi, such as less than about 15,000 psi, such as less than about 12,000 psi, or even less than about 10,000 psi, as measured by ASTM D790.

The multilayer flexible tube further includes an outer layer, the outer layer being a more flexible polymer blend compared to the inner layer. In an embodiment, the outer layer is a "melt processable" polymer. "Melt processable polymer" as used herein refers to a polymer that can melt and flow to extrude in any reasonable form such as films, tubes, fibers, molded articles, or sheets. In an embodiment, the melt processable polymer of the outer layer includes any thermoplastic or thermoset envisioned having a shore hardness that is less than the shore hardness of the inner layer. In an embodiment, the polymer of the outer layer is a melt processable polymer including a thermoplastic polyurethane, a thermoset urethane, a fluoroelastomer, a copolymer of an ethylene propylene diene monomer (EPDM), a thermoplastic EPDM composite, a styrene-based elastomer, a polyolefin elastomer, a flexible polyvinyl chloride (PVC), an isoprene, a thermoplastic isoprene composite, any other thermoplastic elastomer, any alloy, any blend, or combination thereof. In a particular embodiment, the outer layer includes a thermoplastic polyurethane, a thermoset urethane, or combination thereof. In a more particular embodiment, the outer layer includes a thermoplastic polyurethane. In an even more particular embodiment, the thermoplastic polyurethane may be plasticized. In an embodiment, the outer layer includes an alloy of a thermoplastic urethane and polyvinyl chloride. In an embodiment, the outer layer includes a flexible polyvinyl chloride.

In an embodiment, the fluoroelastomer of the outer layer includes fluorinated ethylene propylene (FEP), perfluoroalkoxy (PFA), polyvinylidene fluoride (PVDF), or any combination thereof. In another example, the fluoroelastomer includes a copolymer of vinylidene fluoride and hexafluoropropylene; THV; a copolymer of vinylidene fluoride, hexafluoropropylene, tetrafluoroethylene, and perfluoromethyl vinyl ether; a copolymer of propylene, tetrafluoroethylene, and vinylidene fluoride; a copolymer of vinylidene fluoride, hexafluoropropylene, tetrafluoroethylene, and perfluoromethyl vinyl ether; or any combination thereof.

In a particular example, the polymer of the outer layer includes a diene elastomer. The diene elastomer may be a copolymer formed from at least one diene monomer. For example, the diene elastomer may be a copolymer of ethylene, propylene and diene monomer (EPDM), a thermoplastic EPDM composite, or combination thereof. An exemplary diene monomer may include a conjugated diene, such as butadiene, isoprene, chloroprene, or the like; a non-conjugated diene including from 5 to about 25 carbon atoms, such as 1,4-pentadiene, 1,4-hexadiene, 1,5-hexadiene, 2,5-dimethyl-1,5-hexadiene, 1,4-octadiene, or the like; a cyclic diene, such as cyclopentadiene, cyclohexadiene, cyclooctadiene, dicyclopentadiene, or the like; a vinyl cyclic ene, such as 1-vinyl-1-cyclopentene, 1-vinyl-1-cyclohexene, or the like; an alkylbicyclononadiene, such as 3-methylbicyclo-(4,2,1)-nona-3,7-diene, or the like; an indene, such as methyl tetrahydroindene, or the like; an alkenyl norbornene, such as 5-ethylidene-2-norbornene, 5-butylidene-2-norbornene, 2-methallyl-5-norbornene, 2-isopropenyl-5-norbornene, 5-(1,5-hexadienyl)-2-norbornene, octadienyl)-2-norbornene, or the like; a tricyclodiene, such as 3-methyltricyclo(5,2,1,0$^2$,6)-deca-3,8-diene or the like; or any combination thereof.

In an additional example, the polymer of the outer layer may include a styrene-based elastomer. The styrene-based elastomer typically includes a styrenic based block copolymer that includes, for example, a multiblock copolymer such as a diblock, triblock, polyblock, or any combination thereof. In a particular embodiment, the styrenic based block copolymer is a block copolymer having AB units. Typically, the A units are alkenyl arenes such as a styrene, an alpha-methylstyrene, para-methylstyrene, para-butyl styrene, or combination thereof. In a particular embodiment, the A units are styrene. In an embodiment, the B units include alkenes such as butadiene, isoprene, ethylene, butylene, propylene, or combination thereof. In a particular embodiment, the B units are ethylene, isoprene, or combinations thereof. Exemplary styrenic based block copolymers include triblock styrenic block copolymers (SBC) such as styrene-butadiene-styrene (SBS), styrene-isoprene-styrene (SIS), styrene-ethylene butylene-styrene (SEBS), styrene-ethylene propylene-styrene (SEPS), styrene-ethylene-ethylene-butadiene-styrene (SEEBS), styrene-ethylene-ethylene-propylene-styrene (SEEPS), styrene-isoprene-butadiene-styrene (SIBS), or combinations thereof. In an embodiment, the styrenic based block copolymer is saturated, i.e. does not contain any free olefinic double bonds. In an embodiment, the styrenic based block copolymer contains at least one free olefinic double bond, i.e. an unsaturated double bond. In a particular embodiment, the styrene-based elastomer is a styrene-ethylene based copolymer, a styrene isoprene based copolymer, a blend, or combination thereof.

In an example, the polyolefin elastomer of the outer layer may include a homopolymer, a copolymer, a terpolymer, an alloy, or any combination thereof formed from a monomer, such as ethylene, propylene, butene, pentene, methyl pentene, octene, or any combination thereof. An exemplary polyolefin elastomer includes high density polyethylene (HDPE), medium density polyethylene (MDPE), low density polyethylene (LDPE), ultra or very low density polyethylene (VLDPE), ethylene propylene copolymer, ethylene butene copolymer, polypropylene (PP), polybutene, polybutylene, polypentene, polymethylpentene, polystyrene, ethylene propylene rubber (EPR), ethylene octene copolymer, blend thereof, mixture thereof, and the like. The polyolefin elastomer further includes olefin-based random copolymers, olefin-based impact copolymers, olefin-based block copolymers, olefin-based specialty elastomers, olefin-based specialty plastomers, blends thereof, mixture thereof, and the like.

In a particular example, the polymer of the outer layer is self-bonding. For a self-bonding polymer, a modification to the polymer, either through grafting chemically active functionalities onto the polymeric chains within the polymer or through incorporation of a separated chemical component into the matrix of the polymer, leads to enhanced bonding between the polymer and the layer it is directly adjacent to. Any chemically active functionalities or chemical components are envisioned.

In an embodiment, the polymer of the outer layer has a desirable shore hardness. In a particular embodiment, the melt processable polymer of the outer layer has a shore hardness that is less than the shore hardness of the melt processable fluoropolymer of the inner layer. For instance, the outer layer is formed from a polymer having a shore A hardness of less than about 80, such as about 40 to about 80, or even about 70 to about 80.

In another example, the polymer of the outer layer has further desirable properties. For instance, the polymer of the outer layer has a much higher flexibility than the inner layer as defined by a combination of durometer (or hardness), tensile strength, elongation, and flexibility tests. In an embodiment, the outer layer has a recoverable deformation greater than 150% and the inner layer has a recoverable deformation less than 150% as per ASTM D1646.

In an exemplary embodiment, the polymer of the outer layer may further include any reasonable additive such as a crosslinking agent, a co-agent, a photoinitiator, a filler, a plasticizer, or any combination thereof. Any co-agent is envisioned that increases and/or enhances crosslinking of the polymer composition of the outer layer. In a further embodiment, the use of a co-agent may provide desirable properties such as decreased permeation of small molecules and improved elastic recovery of the outer layer compared to an outer layer that does not include a co-agent. Any co-agent is envisioned such as, for example, bis-phenol AF, triaryl isocyanurate (TAIC), Triaryl cyanurate (TAC), an organic peroxide, or combination thereof. Any reasonable amount of co-agent is envisioned. Alternatively, the polymer of the outer layer may be substantially free of crosslinking agents, co-agents, photoinitiators, fillers, plasticizers, or a combination thereof. "Substantially free" as used herein refers to less than about 1.0% by weight, or even less than about 0.1% by weight of the total weight of the polymer of the outer layer.

Figure 1:
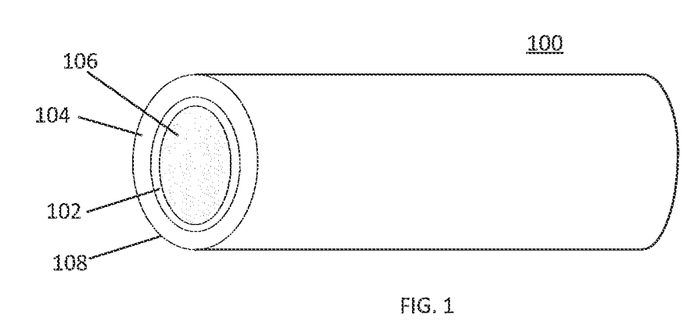
FIGS. 1 and 2 include illustrations of exemplary multilayer flexible tubes.

In an example, FIG. 1 includes an illustration of an exemplary multilayer flexible tube 100 that has at least two layers. For example, an inner layer 102 may be bonded to an outer layer 104. In particular, the inner and outer layers (102, 104) are in direct contact absent any intervening layers, such as adhesive layers. Inner layer 102 has an inner lumen 106 that defines a passage for fluid to flow through. Inner layer 102 is typically a melt processable fluoropolymer and outer layer 104 is typically a melt processable polymer as described above.

Returning to FIG. 1, the outer layer 104 may have a greater thickness than the inner layer 102. For example, the total thickness of the layers of the multilayer flexible tube 100 may be at least 3 mils to about 1000 mils, such as about 3 mils to about 500 mils, or even about 3 mils to about 100 mils. In an embodiment, the inner layer 102 has a thickness in a range of about 0.1 mil to about 100 mil, such as a range of about 0.5 mil to about 100 mil, such as a range of about 1 mil to about 100 mil, such as a range of about 1 mil to about 50 mil, such as a range of about 1 mil to about 10 mil, or even a range of about 1 mil to about 2 mil. The outer layer 104 and optionally other layers may make up the difference. In an example, the outer layer 104 may have a thickness in a range of about 0.1 mils to about 100 mils, such as a range of about 1 mil to about 100 mil, such as a range of about 2 mil to about 50 mils, or even a range of about 5 mil to about 50 mil. In a further example, the ratio of the thickness of the outer layer 104 relative to the thickness of the inner layer 102 is at least about 1.0, such as at least about 1.5, such as at least about 2.0, such as at least about 5.0, or even at least about 10.0.

In an embodiment, at least one layer may be treated to improve adhesion between the inner layer 102 and the outer layer 104. Any treatment is envisioned that increases the adhesion between two adjacent layers. For instance, a surface of the inner layer 102 that is directly adjacent to the outer layer 104 is treated. Further, a surface of the outer layer 104 that is directly adjacent to the inner layer 102 is treated. In an embodiment, the treatment may include surface treatment, chemical treatment, sodium etching, use of a primer, or any combination thereof. In an embodiment, the treatment may include corona treatment, UV treatment, electron beam treatment, flame treatment, scuffing, sodium naphthalene surface treatment, or any combination thereof.

In an embodiment, any post-cure steps may be envisioned. In particular, the post-cure step includes any radiation treatment such as, for example, e-beam treatment, gamma treatment, or combination thereof. In an example, the gamma radiation or ebeam radiation is at about 0.1 MRad to about 50 MRad. In a particular embodiment, the radiation treatment may be provided to increase interlayer and/or intralayer crosslinking.

While only two layers are illustrated in FIG. 1, the multilayer flexible tube 100 may further include additional layers (not illustrated). Any additional layer may be envisioned such as a tie layer, an elastomeric layer, a reinforcement layer, or any combination thereof. Any position of the additional layer with respect to the inner layer and outer layer is envisioned. For instance, an additional elastomeric layer may be disposed on surface 108 of the outer layer 104. In another example, an additional layer such as a reinforcement layer (not shown) may be incorporated within or between additional layers disposed in proximity to surface 108 of the outer layer 104. In an embodiment, the reinforcement layer may be disposed between inner layer 102 and outer layer 104. An exemplary reinforcement layer may include a wire, a fiber, a fabric, such as a woven fabric, a braid, or any combination thereof, formed of a material such as polyester, an adhesion modified polyester, a polyamide, a polyaramid, a glass, a metal, or a combination thereof.

Figure 2:
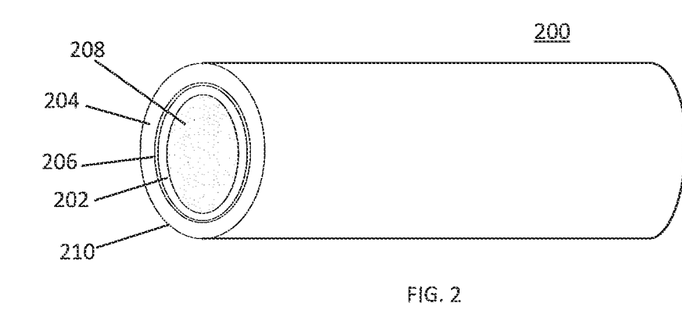

In a further example, FIG. 2 includes an illustration of a multilayer flexible tube 200 that includes more than two layers. In an embodiment, the tube 200 includes an inner layer 202, an outer layer 204 and a tie layer 206. For example, the inner layer 202 may directly contact the tie layer 206. In a particular example, the inner layer 202 forms an inner surface 208 of the tube. The tie layer 206 may be directly bonded to the inner layer 202 without intervening layers. In particular, the tie layer 206 is provided to increase the adhesion of the inner layer 202 to the outer layer 204. The outer layer 204 may directly contact and surround the tie layer 206. The outer layer 204 is the outer layer as described above.

For instance, the tie layer 206 may be any reasonable polymer. In an exemplary embodiment, the tie layer 206 includes a thermoplastic material. For instance, the thermoplastic material may include thermoplastic elastomers, such as cross-linkable elastomeric polymers of natural or synthetic origin. For example, an exemplary elastomeric material may include silicone, natural rubber, urethane, olefinic elastomer, diene elastomer, blend of olefinic and diene elastomer, fluoropolymer, perfluoroelastomer, or any combination thereof. In an embodiment, the tie layer 206 may be a urethane, such as a thermoplastic urethane. In an embodiment, the tie layer 206 may be a polymer blend of a fluoropolymer of the inner layer with a polymer as described for the outer layer. Further exemplary tie layer 206 materials may be EVOH, an acrylate, an acrylate copolymer, an acetal copolymer, and a thermoplastic with high polarity.

In a particular embodiment, the tie layer 206 includes a blend of a thermoplastic urethane with a fluoropolymer copolymer of hexafluoropropylene and poly vinylidene fluoride. In an example, the blend of the thermoplastic urethane with the fluoropolymer copolymer is at a ratio of 50:50 volumetric blends resulting in closer to a 60:40 blend ratio depending on specific gravity of each material. The tie layer 206 may further include an adhesion promoter added to the polymer of the tie layer 206 to increase the adhesion of the tie layer 206 to at least one layer it is directly adjacent to such as, for example, the outer layer 204, the inner layer 202, or combination thereof. For instance, the adhesion promoter includes an adhesion promoter, the adhesion promoter comprising a maleic anhydride grafted PVDF, a silane-based adhesion promoter, an epoxy-based chemical, an EVOH, acrylate polymer, an acrylate copolymer, an acetal copolymer, a thermoplastic with high polarity, or combination thereof.

In an exemplary embodiment, the polymer of the tie layer may further include any reasonable additive such as a crosslinking agent, a co-agent, a photoinitiator, a filler, a plasticizer, or any combination thereof. Any co-agent is envisioned that increases and/or enhances crosslinking of the polymer composition of the tie layer. In a further embodiment, the use of a co-agent may provide desirable properties such as decreased permeation of small molecules and improved elastic recovery of the tie layer compared to a tie layer that does not include a co-agent. Any co-agent is envisioned such as, for example, bis-phenol AF, triaryl isocyanurate (TAIC), Triaryl cyanurate (TAC), an organic peroxide, or combination thereof. Any reasonable amount of co-agent is envisioned. Alternatively, the tie layer may be substantially free of crosslinking agents, co-agents, photoinitiators, fillers, plasticizers, or a combination thereof. "Substantially free" as used herein refers to less than about 1.0% by weight, or even less than about 0.1% by weight of the total weight of the polymer of the tie layer.

While the thicknesses of layers generally described in relation to FIG. 1 apply, the total thickness of the multilayer flexible tube 200 may be between about 3 mils to about 1000 mils, such as about 3 mils to about 500 mils, or even about 3 mils to about 100 mils. In an embodiment, the inner liner 202 may have a thickness in a range of about 0.5 mils to about 50 mils, such as about 0.5 mils to about 20 mils, such as about 1 mil to about 10 mils, or even about 1 mil to about 2 mils, the tie layer 206 and outer layer 204 making up the difference. In a particular embodiment, the outer layer 204 has a thickness greater than the inner liner 202. In a more particular embodiment, the inner liner 202 has a thickness that is greater than the tie layer 206. For instance, the tie layer 206 may have a thickness of about 0.01 mil to about 100 mil, such as a range of about 0.1 mil to about 100 mil, such as a range of about 0.5 mil to about 50 mil, such as a range of about 0.5 mil to about 10 mil, such as a range of about 1 mil to about 10 mil, or even a range of about 1 mil to about 5 mil.

While only three layers are illustrated in FIG. 2, the multilayer flexible tube 200 may further include additional layers (not illustrated). Any additional layer may be envisioned such as an additional tie layer, an elastomeric layer, a reinforcement layer, or combination thereof. Any position of the additional layer on the multilayer flexible tube 200 is envisioned. For instance, an additional elastomeric layer may be disposed on surface 210 of the outer layer 204. In another example, an additional layer such as a reinforcement layer (not shown) may be incorporated within or between additional layers disposed in proximity to surface 210 of the outer layer 204. In an embodiment, the reinforcement layer may be disposed between the inner layer 202 and the outer layer 204. An exemplary reinforcement layer may include a wire, a fiber, a fabric, such as a woven fabric, a braid, or any combination thereof, formed of a material such as polyester, an adhesion modified polyester, a polyamide, a polyaramid, a glass, a metal, or a combination thereof.

In a particular embodiment, the multilayer flexible tube, such as a fluid conduit is formed by providing the inner layer including the fluoropolymer and applying the outer layer to directly contact the bond surface of the inner layer, such as without intervening adhesive or bond enhancing layers. The fluoropolymer may be provided by any method envisioned and is dependent upon the fluoropolymer chosen for the inner layer. In an embodiment, the fluoropolymer is extruded, injection molded, or mandrel wrapped. In an exemplary embodiment, the fluoropolymer is extruded. In an example, the bond surface of the inner layer is prepared with a surface treatment. In an embodiment, the fluopolymer may be cured before, after, or during application of any further layers on the multilayer flexible tube. The inner layer may be cured in place using a variety of curing techniques such as via heat, radiation, or any combination thereof.

The outer layer includes a polymer as described above. The polymer may be provided by any method envisioned and is dependent upon the polymer chosen for the outer layer. The method may further include providing the outer layer by any method. Providing the outer layer depends on the polymer material chosen for the outer layer. In an embodiment, the outer layer is extruded or injection molded.

In an exemplary embodiment, the outer layer may be extruded. In a particular embodiment, the outer layer is extruded over the fluoropolymer layer and the outer layer is cured. In addition, the outer layer may be cured in place using a variety of curing techniques such as via heat, radiation, or any combination thereof.

In a particular embodiment, the first polymer is the melt processable fluoropolymer layer and the outer layer is the melt processable polymer. In an exemplary embodiment, the inner layer is provided by heating the fluoropolymer to an extrusion viscosity and extruding the fluoropolymer to form the inner layer. The outer layer is provided by heating the polymer to an extrusion viscosity and then extruding the polymer. In a particular embodiment, the difference of the viscosity of the fluoropolymer of the inner layer and the viscosity of the polymer of the outer layer is not greater than 25%, such as not greater than 20%, not greater than 10%, or even 0% to provide for improved processing. Although not being bound by theory, it is surmised that the viscosity similarity improves the adhesion of the inner layer to the outer layer.

In an embodiment, the outer layer may overlie the inner layer with a tie layer disposed there between. When the tie layer is used, it is typically provided by any method envisioned and is dependent upon the material chosen for the tie layer. For instance, the tie layer may be extruded. In a particular embodiment, the tie layer is extruded to directly contact the fluoropolymer layer. In an embodiment and depending upon the material chosen, the tie layer is optionally cured. In addition, the tie layer may be cured in place using a variety of curing techniques such as via heat, radiation, or any combination thereof. In an embodiment, the tie layer may be cured before, after, or during the application of the outer layer. In an embodiment, the tie layer is provided by heating the polymer to an extrusion viscosity and then extruding the polymer. In a particular embodiment, the tie layer is heated to an extrusion viscosity of relative equivalence to the inner layer, the outer layer, or the difference there between. Although not being bound by theory, it is surmised that the viscosity similarity improves the adhesion of the tie layer to the inner layer and the outer layer. In an example, the outer layer is disposed to directly contact the tie layer.

Although generally described as a multilayer flexible tube, any reasonable polymeric article can be envisioned. The polymeric article may alternatively take the form of a film, a washer, or a fluid conduit. For example, the polymeric article may take the form or a film, such as a laminate, or a planar article, such as a septa or a washer. In another example, the polymeric article may take the form of a fluid conduit, such as tubing, a pipe, a hose or more specifically flexible tubing, transfer tubing, pump tubing, chemical resistant tubing, high purity tubing, smooth bore tubing, fluoropolymer lined pipe, or rigid pipe, or any combination thereof.

In a particular embodiment, the polymeric mixture may be used to produce tubing and hoses. For instance, the polymeric mixture can be used as tubing or hosing to produce fuel pump tubing, reinforced hosing, chemically resistant hosing, braided hosing, and peristaltic pump hosing and tubing. In a particular embodiment, a multilayer flexible tubing is a fuel tube, a peristaltic pump tube, such as for chemical or detergent dispensing, or a liquid transfer tube, such as a chemically resistant liquid transfer tube.

Tubing includes an inner surface that defines a central lumen of the tube. For instance, tubing may be provided that has any useful diameter size for the particular application chosen. In an embodiment, the tubing may have an outside diameter (OD) of up to about 5.0 inches, such as about 0.25 inch, 0.50 inch, and 1.0 inch. In an embodiment, the tubing may have an inside diameter (ID) of about 0.03 inches to about 4.00 inches, such as about 0.06 inches to about 1.00 inches. Multilayer flexible tubing as described advantageously exhibits desired properties such as increased lifetime. For example, the multilayer flexible tube may have a pump life of at least about 12 hours of continuous operating use when tested at 600 RPM and zero back pressure on a Cole Parmer EZ Load II pump head and water as the pumping medium.

In embodiment, the resulting multilayer flexible tube may have further desirable physical and mechanical properties. In an embodiment, the multilayer flexible tube has desirable resistance to fuel permeation of less than about 15 g/day/m$^2$, when measured by SAE J30 and SAE J1737 (in compliance with the California Air Resources Board). Further, the inner layer and the outer layer are resistant to layer separation after exposure to fuel after at least 2 weeks at 110° F. In an embodiment, the multilayer flexible tubes are kink-resistant and appear transparent or at least translucent. For instance, the multilayer flexible tube may have a light transmission greater than about 2%, or greater than about 5% in the visible light wavelength range. In particular, the multilayer flexible tube has desirable flexibility and substantial clarity or translucency. For example, the multilayer flexible tube has a bend radius of at least 0.5 inches. For instance, the multilayer flexible may advantageously produce low durometer tubes. For example, the multilayer flexible tube has a Shore A durometer of between about 35 and about 90, such as between about 55 to about 70 having desirable mechanical properties may be formed. Such properties are indicative of a flexible material.

Further, the multilayer flexible tube has advantageous physical properties when exposed to ultraviolet light. For instance, the multilayer flexible tube does not crack when exposed to ultraviolet light of 0.90 Irradiance for over 450 hours at about 60° C. Further, the multilayer flexible tube has a flexural modulus of at least about 10,000 psi, such as about 10,000 psi to about 20,000 psi, as measured by ASTM D790.

Applications for the multilayer flexible tubing are numerous. In an exemplary embodiment, the multilayer flexible tubing may be used in applications such as industrial, wastewater, digital print equipment, automotive, or other applications where chemical resistance, and/or low permeation to gases and hydrocarbons, and/or high purity are desired.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Item 1. A multilayer flexible tube comprising an inner layer comprising a melt processable fluoropolymer, wherein the fluoropolymer comprises a copolymer of a poly vinylidene fluoride (PVDF) and a hexafluoropropylene (HFP); an outer layer comprising a melt processable polymer having a shore hardness less than a shore hardness of the inner layer.

Item 2. A method of making a multilayer flexible tube comprising providing an inner layer comprising a melt processable fluoropolymer, wherein the fluoropolymer comprises a copolymer of a poly vinylidene fluoride (PVDF) and a hexafluoropropylene (HFP); and providing an outer layer comprising a melt processable polymer having a shore hardness less than a shore hardness of the inner layer.

Item 3. The multilayer tube or the method of making the multilayer flexible tube of any of the preceding Items, wherein the copolymer of the poly vinylidene fluoride and the hexafluoropropylene is at a molar concentration of 1:99 to 99:1, such as about 20:80 to 80:20, or about 40:60 to 60:40.

Item 4. The multilayer flexible tube or the method of making the multilayer flexible tube of any of the preceding Items, wherein the copolymer of the poly vinylidene fluoride and the hexafluoropropylene has a shore D of less than about 95, such as a shore A of about 80 to shore D of about 95, such as shore A of about 80 to shore D of about 65, such as shore A of about 85 to about 90.

Item 5. The multilayer flexible tube or the method of making the multilayer flexible tube of any of the preceding Items, wherein the outer layer is a thermoplastic polyurethane, a thermoset urethane, a fluoroelastomer, EPDM, a thermoplastic EPDM composite, a styrene-ethylene based copolymer, a styrene isoprene based copolymer, a polyolefin elastomer, a PVC, an isoprene, a thermoplastic isoprene composite, a blend, an alloy, or any combination thereof.

Item 6. The multilayer flexible tube or the method of making the multilayer flexible tube of Item 5, wherein the outer layer is a thermoplastic polyurethane, a PVC, an alloy, or combination thereof.

Item 7. The multilayer flexible tube or the method of making the multilayer flexible tube of any of the preceding Items, wherein the outer layer has a shore A hardness of less than about 80, such as about 40 to about 80, or even about 70 to about 80.

Item 8. The multilayer flexible tube or the method of making the multilayer flexible tube of any of the preceding Items, wherein the inner layer is disposed directly on the outer layer.

Item 9. The multilayer flexible tube or the method of making the multilayer flexible tube of any of the preceding Items, further comprising a tie layer disposed between the inner layer and the outer layer.

Item 10. The multilayer flexible tube or the method of making the multilayer flexible tube of Item 9, wherein the tie layer comprises a thermoplastic urethane, a blend of a thermoplastic urethane with a fluoropolymer copolymer of hexafluoropropylene and poly vinylidene fluoride, or a combination thereof.

Item 11. The multilayer flexible tube or the method of making the multilayer flexible tube of Items 9 or 10, wherein the tie layer further comprises an adhesion promoter, the adhesion promoter comprising a maleic anhydride grafted PVDF, a silane-based adhesion promoter, an epoxy-based chemical, an EVOH, acrylate polymer, an acrylate copolymer, an acetal copolymer, a thermoplastic with high polarity, or combination thereof.

Item 12. The multilayer flexible tube or the method of making the multilayer flexible tube of any of the preceding Items, wherein the flexible tube has a resistance to fuel permeation of less than about 15 g/day/m$^2$, when measured by SAE J30 and SAE J1737.

Item 13. The multilayer flexible tube or the method of making the multilayer flexible tube of any of the preceding Items, wherein the multilayer flexible tube has a flexural modulus of at least about 10,000, such as about 10,000 to about 20,000.

Item 14. The multilayer flexible tube or the method of making the multilayer flexible tube of any of the preceding Items, wherein multilayer flexible tube has a lifetime of at least 12 hours of continuous operating use when tested at 600 RPM and zero back pressure on a Cole Parmer EZ Load II pump head.

Item 15. The multilayer flexible tube or the method of making the multilayer flexible tube of any of the preceding Items, wherein the inner layer and the outer layer are resistant to layer separation after exposure to fuel after at least 2 weeks at 110° F.

Item 16. The multilayer flexible tube or the method of making the multilayer flexible tube of any of the preceding Items, wherein the multilayer flexible tube does not crack when exposed to ultraviolet light at 0.90 Irradiance for over 450 hours at about 60° C.

Item 17. The multilayer flexible tube or the method of making the multilayer flexible tube of any of the preceding Items, wherein the multilayer flexible tube is a fuel tube, a peristaltic pump tube, or a chemically resistant liquid transfer tube.

Item 18. The multilayer flexible tube or the method of making the multilayer flexible tube of any of the preceding Items, wherein the inner layer, the outer layer, or combination thereof further comprises a co-agent.

Item 19. The multilayer flexible tube or the method of making the multilayer flexible tube of Item 18, wherein the co-agent comprises bis-phenol AF, triaryl isocyanurate (TAIC), Triaryl cyanurate (TAC), an organic peroxide, or combination thereof.

Item 20. The multilayer flexible tube or the method of making the multilayer flexible tube of Item 18 or 19, further comprising irradiating the multilayer flexible tube, such as via gamma radiation or ebeam radiation at about 0.1 MRad to about 50 MRad.

Item 21. The method of making the multilayer the flexible tube of any of the preceding Items, wherein providing the inner layer and providing the outer layer includes heating the fluoropolymer to an extrusion viscosity and the polymer of the outer layer to an extrusion viscosity, wherein a difference of the extrusion viscosity of the fluoropolymer and the extrusion viscosity of the polymer is not greater than 25%.

Item 22. The method of making the multilayer flexible tube of Item 21, further comprising heating a tie layer to an extrusion viscosity of relative equivalence to the inner layer, the outer layer, or the difference therebetween.

Item 23. The method of making the multilayer flexible tube of Items 21 or 22, further comprising extruding the inner layer, the outer layer, the tie layer, or combination thereof.

Item 24. A multilayer flexible tube comprising an inner layer comprising a melt processable fluoropolymer, wherein the fluoropolymer comprises a copolymer of a poly vinylidene fluoride (PVDF) and a hexafluoropropylene (HFP); an outer layer comprising a melt processable polymer having a shore hardness less than a shore hardness of the inner layer; and a tie layer disposed between the inner layer and the outer layer, wherein the tie layer comprises a thermoplastic urethane, a blend of a thermoplastic urethane with a fluoropolymer copolymer of hexafluoropropylene and poly vinylidene fluoride, or a combination thereof.

Item 25. The multilayer flexible tube of Item 24, wherein the outer layer is a thermoplastic polyurethane, a thermoset urethane, a fluoroelastomer, EPDM, a thermoplastic EPDM composite, a styrene-ethylene based copolymer, a styrene isoprene based copolymer, a polyolefin elastomer, a PVC, an isoprene, a thermoplastic isoprene composite, a blend, an alloy, or any combination thereof.

Item 26. The multilayer flexible tube of Item 25, wherein the outer layer is a thermoplastic polyurethane, a PVC, an alloy, or combination thereof.

Item 27. A multilayer flexible tube comprising an inner layer comprising a melt processable fluoropolymer, wherein the fluoropolymer comprises a copolymer of a poly vinylidene fluoride (PVDF) and a hexafluoropropylene (HFP); an outer layer comprising a melt processable polymer having a shore hardness less than a shore hardness of the inner layer; wherein the inner layer, the outer layer, or combination thereof comprises a co-agent comprising bis-phenol AF, triaryl isocyanurate (TAIC), Triaryl cyanurate (TAC), organic peroxides or combination thereof.

Item 28. The multilayer flexible tube of Item 27, wherein the multilayer flexible tube is irradiated, such as via gamma radiation or ebeam radiation at about 0.1 MRad to about 50 MRad.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

Examples

Two-layer and three-layer tubes are formed. Two-layer tubes are formed by extruding an inner layer of a copolymer of a poly vinylidene fluoride (PVDF) and a hexafluoropropylene (HFP) ("Kynar Ultraflex" available from Arkema Inc.) with an outer layer of thermoplastic polyurethane. Three two-layer tubes are formed with the same materials but with differing thickness of the inner layer. A three-layer tube (341-167-1) is formed by extruding an inner layer of a copolymer of a poly vinylidene fluoride (PVDF) and a hexafluoropropylene (HFP) ("Kynar Ultraflex" available from Arkema Inc.), an outer layer of a thermoplastic polyurethane/polyvinyl chloride alloy, and a tie layer of a blend of a thermoplastic urethane with a fluoropolymer copolymer of hexafluoropropylene and poly vinylidene fluoride. A three-layer tube (LP-1100) is formed by extruding an inner layer of a copolymer of a poly vinylidene fluoride (PVDF) and a hexafluoropropylene (HFP) ("Kynar 2500" available from Arkema Inc.) and an outer layer of a flexible polyvinyl chloride (PVC) with a thermoplastic polyurethane tie layer. The tubes are compared to a single-layer flexible polyvinyl chloride tube. Examples of the tube can be seen in Table 1.

TABLE 1

| Sample name | # of layers | Tube construction (inner/outer) |
|---|---|---|
| F-4040-A | 1 | Flexible PVC |
| 160-136-1 | 2 | "Kynar Ultraflex" (0.008")/TPU (C78A Elastallon) |
| 160-146-3 | 2 | "Kynar Ultraflex" (0.012")/TPU (C78A Elastallon) |
| 160-146-4 | 2 | "Kynar Ultraflex" (0.015")/TPU (C78A Elastallon) |
| 341-167-1 | 3 | "Kynar Ultraflex"/tie layer/TPU-PVC alloy |
| LP-1100 | 3 | "Kynar 2500"/tie layer/Flexible PVC |

The samples are subjected to a permeation test. The permeation test is conducted via either J30 or J1737. Results can be seen in Table 2. Clearly the two-layer and three layer constructions of the present invention have desirably low permeation rates compared to the flexible polyvinyl chloride.

TABLE 2

| Sample name | Permeation rate, CE10 (g/day/m²) |
|---|---|
| F-4040-A | >500 |
| LP-1100 | 12 |
| 160-136-1 | 8.5 |
| 341-167-1 | 3.3 |

Table 3 shows volume change of the tube in different fuel grade samples at room temperature and an elevated temperature of 110° F. The results are for multi-layer tubes, 160-136-1 and LP-1100.

TABLE 3

| | 160-136-1 | | LP-1100 | |
|---|---|---|---|---|
| | % Volume Change (StDev)—Dry room temp | % Volume Change (StDev)—Dry 110° F. | % Volume Change (StDev)—Dry room temp | % Volume Change (StDev)—Dry 110° F. |
| Month 1-E85 | 8.78 (0.14) | 9.11 (0.16) | −2.41 (1.78) | −24.59 (1.25) |
| Month 2-E85 | 9.11 (0.08) | 8.79 (0.22) | −8.65 (0.81) | −29.38 (0.94) |
| Month 3-E85 | 8.27 (0.39) | 8.20 (0.02) | −9.73 (0.79) | −29.52 (1.77) |
| Month 1-E15 | 13.28 (0.18) | 12.98 (0.37) | −6.86 (3.32) | −21.88 (0.48) |
| Month 2-E15 | 14.66 (1.15) | 14.09 (0.60) | −9.86 (3.24) | −24.40 (0.90) |
| Month 3-E15 | 12.36 (0.14) | 13.84 (0.39) | −11.66 (3.14) | −25.97 (0.55) |
| Month 1-CE10 | 13.66 (0.30) | 14.74 (0.36) | −0.42 (4.28) | −15.89 (0.47) |
| Month 2-CE10 | 11.61 (0.27) | 12.95 (0.16) | −5.77 (2.79) | −7.27 (0.51) |
| Month 3-CE10 | 12.22 (0.28) | 12.62 (0.21) | −10.04 (0.55) | −12.08 (1.37) |

Desirable volume percentage change is less than 30%, 25%, 20%, such as even less than 15%.

Table 4 shows Fitting Pull Off (lbs-force) of the exemplary tubes in different fuel grade samples at room temperature and an elevated temperature of 110° F. The results are for multi-layer tubes, 160-136-1 and LP-1100.

TABLE 4

| | 160-136-1 | | LP-1100 | |
|---|---|---|---|---|
| | Fitting Pull Off (StDev)—Dry room temp | Fitting Pull Off (StDev)—Dry 110° F. | Fitting Pull Off (StDev)—Dry room temp | Fitting Pull Off (StDev)—Dry 110° F. |
| Month 1-E85 | 8.17 (0.25) | 8.41 (0.36) | 20.34 (0.22) | 11.62 (—) |
| Month 2-E85 | 6.70 (0.60) | 8.24 (0.09) | 8.34 (2.05) | 12.60 (—) |
| Month 3-E85 | 6.40 (0.39) | 7.55 (0.34) | 5.13 (—) | 11.86 (0.24) |
| Month 1-E15 | 7.10 (1.26) | 5.94 (1.04) | 17.90 (—) | 9.60 (—) |
| Month 2-E15 | 5.01 (1.16) | 2.81 (1.95) | | 0.00 (—) |
| Month 3-E15 | 4.81 (0.64) | 2.87 (0.17) | 11.80 (—) | 12.67 (—) |
| Month 1-CE10 | 6.36 (0.52) | 4.14 (0.79) | 14.93 (3.43) | 11.71 (—) |
| Month 2-CE10 | 4.33 (0.52) | 2.30 (0.49) | 7.92 (0.02) | 8.73 (—) |
| Month 3-CE10 | 4.91 (0.67) | 2.45 (0.50) | 4.35 (0.70) | 8.16 (—) |

Table 5 shows Fitting Pull Off (lbs-force) of the tube in different fuel samples at room temperature and an elevated temperature of 110° F. The results are for sample 341-167-1 (three layer tube).

TABLE 5

| | 341-167-1 | |
|---|---|---|
| | Fitting Pull Off—Dry Room temperature | Fitting Pull Off—Dry 110° F. |
| Month 1-E85 | 9.72 | 7.30 |
| Month 1-E15 | 9.36 | 4.07 |
| Month 1-CE10 | 6.98 | 3.77 |

Table 6 shows Fitting Pull Off (lbs-force) of the tube in different fuel grade samples in wet conditions at room temperature and an elevated temperature of 110° F. The results are for multi-layer tubes, 160-136-1 and LP-1100.

TABLE 6

| | 160-136-1 | | LP-1100 | |
|---|---|---|---|---|
| | Fitting Pull Off—Wet Room temp | Fitting Pull Off—Wet 110° F. | Fitting Pull Off—Wet Room temp | Fitting Pull Off—Wet 110° F. |
| Month 1-E85 | 7.391 | 6.852 | 18.857 | — |
| Month 2-E85 | 6.939 | 6.606 | 10.177 | — |
| Month 3-E85 | 7.147 | 6.253 | — | — |
| Month 1-E15 | 5.378 | 3.175 | 16.5 | 8.9 |
| Month 2-E15 | 4.936 | 2.470 | — | — |
| Month 3-E15 | 4.019 | 0.552 | — | — |
| Month 1-CE10 | 2.269 | 1.276 | 14.229 | — |
| Month 2-CE10 | 1.915 | 0.847 | 7.695 | — |
| Month 3-CE10 | 1.800 | 0.626 | — | 9.485 |

Normal control fitting pull off (lbs-force) is measured and results can be seen in Table 7.

TABLE 7

| Sample | Normal Control Fitting Pull Off (StDev) |
|---|---|
| LP-1100 | 31.70 (1.66) |
| 160-136-1 | 18.82 (1.12) |
| 160-146-3 | 22.03 (0.55) |
| 160-146-4 | 22.26 (0.87) |

Generally a high fitting pull off value is desirable for both wet and dry conditions, but is desirably balanced with a low force to pull off of the fitting for ease of repair.

Force to Push On (lbs-force) can be seen in Table 8. Table 9 shows results of Pull Through Force (lbs-force), UV testing, and Pressure testing. UV testing was done via ANSI B 175.2 Annex D.1

TABLE 8

| Force to Push On—non-normalized | LP-1100 | 160-136-1 | 160-146-3 | 160-146-4 | 341-167-1 |
|---|---|---|---|---|---|
| ⅛"-B2 ½ | 9.33 (1.34) | 5.28 (0.26) | 6.60 (0.48) | 7.80 (0.32) | 6.16 (.42) |
| ⅛"-B3 | 11.37 (1.05) | 12.32 (0.52) | 13.16 (0.96) | 12.72 (0.48) | 11.34 (2.19) |
| B-2-HC-1-2 | 11.77 (0.70) | 10.88 (1.40) | 9.66 (0.39) | 9.88 (0.96) | — |

TABLE 9

|  | LP1100 | 160-136-1 | 341-167-1 |
|---|---|---|---|
| Pull Through Force (lbs-force) | 9.11 (0.52) | 6.72 (0.27) | 4.6 (0.19) |
| UV | Pass | Pass | Pass |
| Pressure Testing (Passing interference) | 5% | 5% | 5% |

The two-layer and three-layer exemplary tubes have further desirable properties such as flexibility and force on push. Furthermore, the exemplary tubes of the present invention have a desirably low pull through force. A desirable pull through force is less than 20 lbs-force. Further, the exemplary tubes passed UV testing and have desirable pressure testing, which was an indication of no leakage. At 5%, the tubes seen in Table 9 did not leak.

Table 10 is elasticity data at 10% interference for exemplary tubes.

| Summary | % Elongation (2"/minute) | % Elongation after recovery (2"/min) | % Elongation (20"/min) | % Elongation after recovery (20"/min) |
|---|---|---|---|---|
| F-4040-A | 32.90% | 0.69% | 38.89% | 0.00% |
| LP-1100 | 57.73% | 8.68% | 85.00% | 15.36% |
| 160-136-1 | 22.52% | 1.04% | — | — |
| 160-146-4 | 24.91% | 0.35% | 24.33% | 3.13% |
| 341-167-1 | 36.66% | 2.26% | 20.00% | 1.04% |

Tubing is pulled through at a specified rate through a 10% interference fit. The tubing length is measured before and after. Generally, 0% change in tube length is desirable.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A multilayer flexible tube comprising:
   an inner layer comprising a melt processable fluoropolymer, wherein the fluoropolymer comprises a copolymer of a poly vinylidene fluoride (PVDF) and a hexafluoropropylene (HFP), wherein the inner layer has an inner lumen that defines a passage for fluid to flow through; and
   an outer layer comprising a melt processable polymer having a shore hardness less than a shore hardness of the inner layer, wherein the inner layer, the outer layer, or combination thereof further comprises a co-agent comprising bis-phenol AF, triaryl isocyanurate (TAIC), Triaryl cyanurate (TAC), an organic peroxide, or combination thereof.

2. The multilayer tube of claim 1, wherein the molar ratio of the poly vinylidene fluoride to the hexafluoropropylene in the copolymer is 1:99 to 99:1.

3. The multilayer flexible tube of claim 1, wherein the copolymer of the poly vinylidene fluoride and the hexafluoropropylene has a shore D of less than about 95.

4. The multilayer flexible tube of claim 1, wherein the outer layer is a thermoplastic polyurethane, a thermoset urethane, a fluoroelastomer, EPDM, a thermoplastic EPDM composite, a styrene-ethylene based copolymer, a styrene isoprene based copolymer, a polyolefin elastomer, a PVC, an isoprene, a thermoplastic isoprene composite, a blend, an alloy, or any combination thereof.

5. The multilayer flexible tube of claim 1, wherein the outer layer has a shore A hardness of less than about 80.

6. The multilayer flexible tube of claim 1, wherein the inner layer is disposed directly on the outer layer.

7. The multilayer flexible tube of claim 1, further comprising a tie layer disposed between the inner layer and the outer layer.

8. The multilayer flexible tube of claim 7, wherein the tie layer comprises a thermoplastic urethane, a blend of a thermoplastic urethane with a fluoropolymer copolymer of hexafluoropropylene and poly vinylidene fluoride, or a combination thereof.

9. The multilayer flexible tube of claim 7, wherein the tie layer further comprises an adhesion promoter, the adhesion promoter comprising a maleic anhydride grafted PVDF, a silane-based adhesion promoter, an epoxy-based chemical, an EVOH, acrylate polymer, an acrylate copolymer, an acetal copolymer, a thermoplastic with polarity, or combination thereof.

10. The multilayer flexible tube of claim 1, wherein the flexible tube has a resistance to fuel permeation of less than about 15 g/day/m$^2$, when measured by SAE J30 and SAE J1737.

11. The multilayer flexible tube of claim 1, wherein the multilayer flexible tube has a flexural modulus of at least about 10,000 psi.

12. The multilayer flexible tube of claim 1, wherein the inner layer and the outer layer are resistant to layer separation after exposure to fuel after at least 2 weeks at 110° F.

13. The multilayer flexible tube of claim 1, wherein the multilayer flexible tube is a fuel tube, a peristaltic pump tube, or a chemically resistant liquid transfer tube.

14. The multilayer flexible tube of claim 1, wherein the multilayer flexible tube is irradiated.

15. A multilayer flexible tube comprising:
   an inner layer comprising a melt processable fluoropolymer, wherein the fluoropolymer comprises a copolymer of a poly vinylidene fluoride (PVDF) and a hexafluoropropylene (HFP), wherein the inner layer has an inner lumen that defines a passage for fluid to flow through;
   an outer layer comprising a melt processable polymer having a shore hardness less than a shore hardness of the inner layer, wherein the inner layer, the outer layer, or combination thereof further comprises a co-agent comprising bis-phenol AF, triaryl isocyanurate (TAIC), Triaryl cyanurate (TAC), an organic peroxide, or combination thereof; and a tie layer disposed between the inner layer and the outer layer, wherein the tie layer comprises a thermoplastic urethane, a blend of a thermoplastic urethane with a fluoropolymer copolymer of hexafluoropropylene and poly vinylidene fluoride, or a combination thereof.

16. The multilayer flexible tube of claim 15, wherein the outer layer is a thermoplastic polyurethane, a thermoset urethane, a fluoroelastomer, EPDM, a thermoplastic EPDM composite, a styrene-ethylene based copolymer, a styrene isoprene based copolymer, a polyolefin elastomer, a PVC, an isoprene, a thermoplastic isoprene composite, a blend, an alloy, or any combination thereof.

17. A method of making a multilayer flexible tube comprising:

providing an inner layer comprising a melt processable fluoropolymer, wherein the fluoropolymer comprises a copolymer of a poly vinylidene fluoride (PVDF) and a hexafluoropropylene (HFP), wherein the inner layer has an inner lumen that defines a passage for fluid to flow through; and providing an outer layer comprising a melt processable polymer having a shore hardness less than a shore hardness of the inner layer, wherein the inner layer, the outer layer, or combination thereof further comprises a co-agent comprising bis-phenol AF, triaryl isocyanurate (TAIC), Triaryl cyanurate (TAC), an organic peroxide, or combination thereof.

18. The method of making the multilayer the flexible tube of claim 17, wherein providing the inner layer and providing the outer layer includes heating the fluoropolymer to an extrusion viscosity and the polymer of the outer layer to an extrusion viscosity, wherein a difference of the extrusion viscosity of the fluoropolymer and the extrusion viscosity of the polymer is not greater than 25%.

* * * * *